United States Patent
Sulenski

[11] Patent Number: 6,138,394
[45] Date of Patent: Oct. 31, 2000

[54] PORTABLE DIRECTIONAL ARROW

[76] Inventor: Stanley E. Sulenski, 1115 Main St., Holyoke, Mass. 01040

[21] Appl. No.: 09/098,290

[22] Filed: Jun. 16, 1998

[51] Int. Cl.[7] .................................................. G09F 21/04
[52] U.S. Cl. ........................... 40/591; 40/600; 248/206.5; 248/467
[58] Field of Search .................. 40/550, 559, 564, 40/572, 591, 600, 661.02, 593, 757, 594; 248/206.5, 467, 683; D20/42; 340/321, 473

[56] References Cited

U.S. PATENT DOCUMENTS

| | | | |
|---|---|---|---|
| D. 321,374 | 11/1991 | Whitlock et al. | D20/42 |
| D. 354,991 | 1/1995 | De Sutter | D20/42 |
| 742,309 | 10/1903 | Goehst | 40/550 |
| 1,713,053 | 5/1929 | Priest | 40/550 |
| 3,680,238 | 8/1972 | Arnold | 40/564 |
| 4,607,444 | 8/1986 | Foster | 40/591 X |
| 5,005,306 | 4/1991 | Kinstler | 40/591 X |
| 5,103,205 | 4/1992 | Halligan | 40/591 X |
| 5,606,309 | 2/1997 | Smith | 340/473 |

*Primary Examiner*—Brian K. Green
*Attorney, Agent, or Firm*—McCormick, Paulding & Huber LLP

[57] ABSTRACT

A portable directional arrow that can be utilized to direct traffic at any time during the day or night. The directional arrow may be manually held or contains at least one attachment device to attach the directional arrow to a surface. At least one light source is attached to the arrow that is electrically connected to an adaptor that is designed to plug into a cigarette lighter for a motor vehicle. The directional arrow has two separable housings. The housings can be fastened and utilized as a single arrow with one side containing the light source for visibility at night and the other side containing a high-visibility color for visibility during the day. Further the two housings may be separated to be utilized as two completely different sets of directional arrows.

9 Claims, 1 Drawing Sheet

PORTABLE DIRECTIONAL ARROW

FIELD OF THE INVENTION

The present invention relates to directional devices and, in particular to portable traffic directional devices.

BACKGROUND OF THE INVENTION

Portable directional devices such as arrows, signs, flash lights, signal lights, wands, strobes, or the like are often used to control the flow of traffic. They are essential safety devices when used to direct traffic during emergency situations which require police or medical assistance, or the like.

However, emergency situations can develop quickly, and often require trained personnel to perform multiple tasks such as triage, interviews, medical assistance, or the like, in addition to traffic control. Therefore directional devices that must be hand held for proper use can unnecessarily tie up essential personnel, or waste precious time. A typical version of a prior art directional device with this type of problem is disclosed in U.S. Pat. No. 5,079,679. This prior art invention describes a traffic director's stick which performs multiple functions, but must always be operated by hand.

Further many directional devices such as signs, or arrows mounted on signs, are not compact enough to be carried as standard equipment in most emergency vehicles. Therefore they often are transported to the scene of an emergency long after the initial trained personnel have arrived. This also wastes time and puts essential personnel at unnecessary risk.

Additionally, portable directional devices must be capable of being used in a variety of different weather conditions, and at any time during the day or night. Such portable directional devices often require lighting to be seen properly. In order to power the lighting and preserve portability, batteries are most often used. However, batteries will run out and have to be replaced or recharged, which again takes more time, can put personnel at risk, and costs money.

It is also very desirable that portable directional devices come in more than one high-visibility color. This enables them to be easily seen during the day, and to communicate different signals, such as "stop" or "caution", to the on coming traffic. However, this often results in the need for multiple directional devices, which can take up unnecessary storage space and cost.

SUMMARY OF THE INVENTION

The present invention provides a portable directional arrow that can be utilized to direct traffic at any time during the day or night. The directional arrow may be manually held or contains at least one attachment device to attach the directional arrow to a surface. At least one light source is attached to the arrow that is electrically connected to an adaptor that is designed to plug into a cigarette lighter for a motor vehicle.

According to the invention the directional arrow has two separable housings. The housings can be fastened and utilized as a single arrow with one side containing the light source for visibility at night and the other side containing a high-visibility color for visibility during the day. Further the two housings may be separated to be utilized as two completely different sets of directional arrows.

A feature of the invention is that in an emergency situation it can easily be attached to the surface of a motor vehicle. This gives the trained emergency personnel the option of either operating the directional arrow by hand or mounting the directional arrow on a motor vehicle to control traffic while the personnel attends to the details of the emergency.

A further feature of the directional arrow is that it is designed to be compact enough to be carried as standard equipment in most emergency vehicles. Therefore, the first trained personnel to arrive at the scene of the emergency will advantageously be able to utilize the directional arrow immediately. This feature reduces the amount of time, as well as the necessary personnel, to attend to an emergency and control traffic. Therefore, the amount of risk to the trained personnel is also reduced.

Another feature of the invention is that the light source of the directional arrow may be powered by the motor vehicle battery or generator. Therefore, the risk of the light source not having power or losing power is kept to a minimum.

BRIEF DESCRIPTION OF THE DRAWINGS

Other features and benefits of the invention will be more clearly understood with reference to the specification and the accompanying drawings of which.

DETAILED DESCRIPTION OF THE PREFERRED EMBODIMENT

Figure 1:
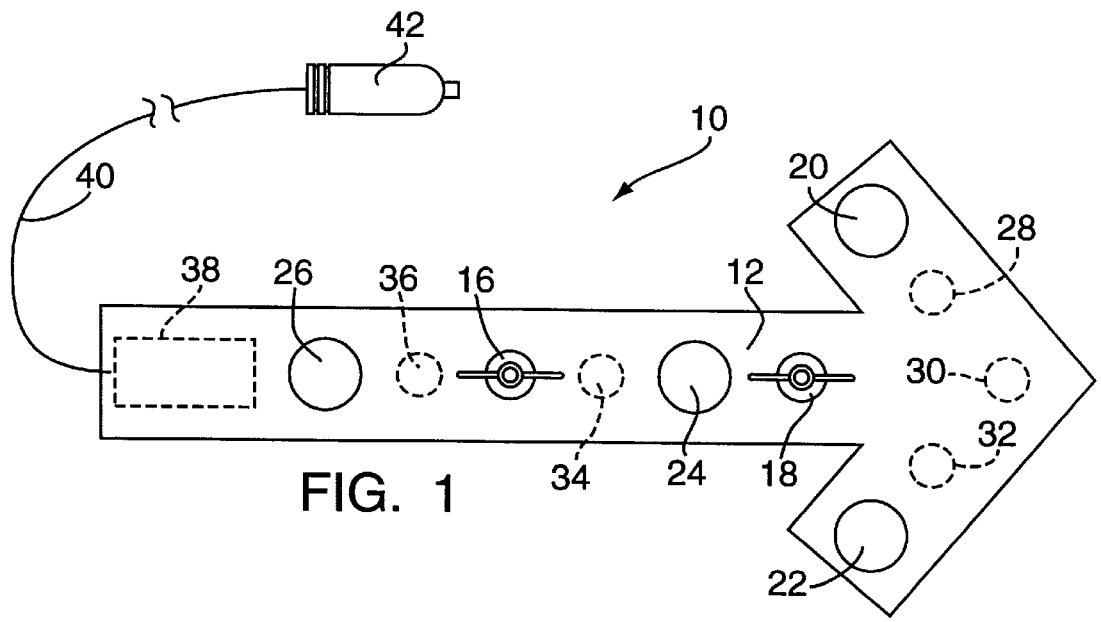
FIG. 1 is a front-view of a portable directional arrow containing a first housing with a light source.
Figure 2:
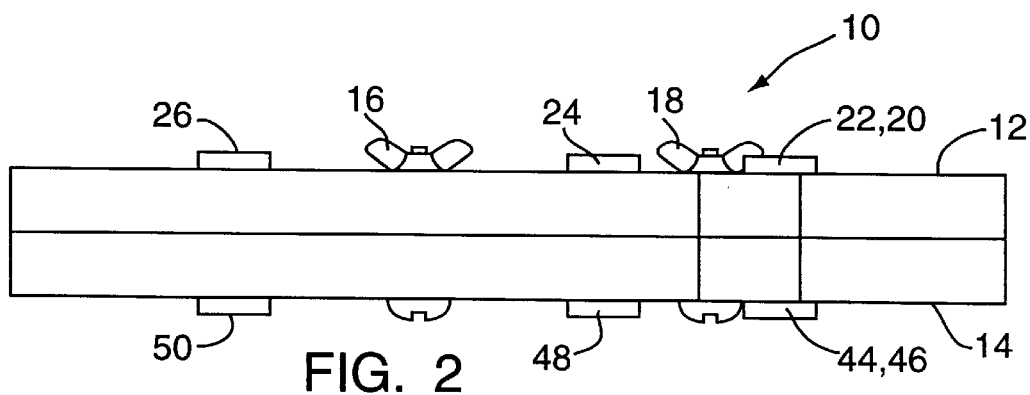
FIG. 2 is a side-view of the portable directional arrow showing the first housing and a second housing.

As illustrated in FIGS. 1 and 2, a portable directional arrow 10 according to the invention is comprised of a first housing 12 and a second housing 14 each housing having the shape of an arrow. The housings 12 and 14 are fastened to each other by fasteners 16 and 18, such as wing nuts. Housing 12 further contains attaching devices 20, 22, 24 and 26, such as magnets, for attaching the housing 12 to a surface. Additionally, housing 12 contains light sources 28, 30, 32, 34 and 36 which are electrically connected to electric circuit 38 which is in turn electrically connected to wire 40 which connects electrically to an adaptor 42 designed to plug into a cigarette lighter of a motor vehicle.

Figure 3:
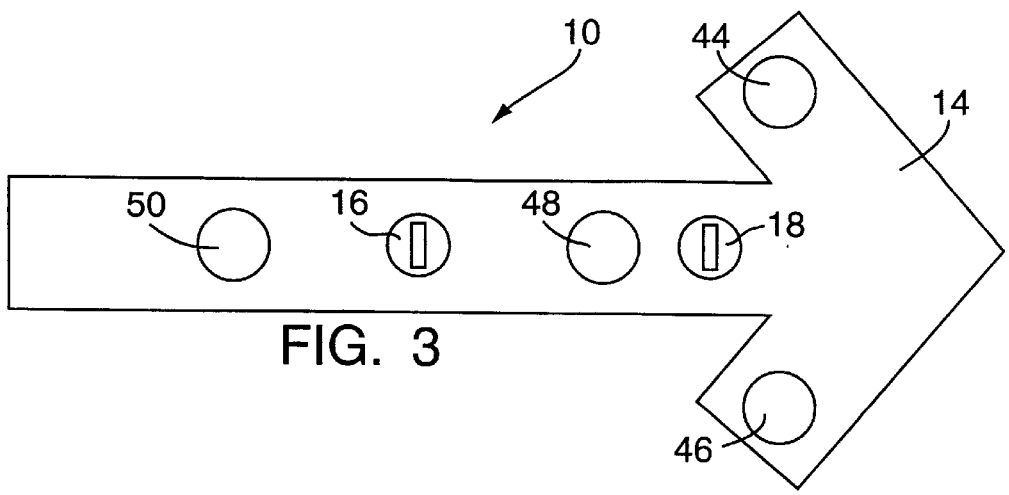
FIG. 3 is a front-view of the portable directional arrow showing the second housing with no light source.

As further illustrated in FIG. 3, housing 14 is also provided with attaching devices 44, 46, 48 and 50, such as magnets, the housing 14 to a surface. Each housings 12 and 14 are preferably constructed of their own high-visibility colored plastic such as red, amber, yellow, blue, orange, or the like.

A feature of the invention is that housings 12 and 14 can be fastened together to form a single directional arrow 10 with a day time side and a night time side. The housing 12 can be utilized at night with its light sources 28, 30, 32, 34 and 36 that may be designed to illuminate continuously, intermittently, sequentially, or the like. Housing 14, with its high visibility color, can be utilized for controlling the direction of traffic during the day. Alternatively, the two housings 12 and 14 may be easily and advantageously separated to be utilized as two separate directional arrows.

Another feature of the invention, is that essential emergency personnel have the option of utilizing the directional arrow 10 either manually or automatically by attaching the arrow on a motor vehicle, therefore freeing the emergency personnel to do other tasks such as triage, or carrying on interviews, or providing medical assistance, or the like.

An additional feature of the invention is that it is compact enough to be carried in multiple quantities in most emergency vehicles. Because the portable directional arrow 10 can be attached to a vehicle, several arrows can be mounted on the outside surface of a vehicle to provide greater visibility to on-coming traffic. Additionally vehicle can be used as a protective shield for the personnel as they perform their emergency duties.

An additional feature of the portable directional arrow 10 is that it may be plugged into a motor vehicle cigarette lighter with adaptor 42. This advantageously minimizes the possibility of the light sources 28, 30, 32, 34 and 36 running out of power.

Although the portable directional arrow 10 is shown as having magnets as attachment devices, it will be appreciated that any number of other attachment devices can also be used. Examples of other attachment devices are: suction cups, straps, hooks, hook and loop fasteners, mounting brackets, or the like. It will be additionally appreciated that some attachment devices, such as magnets, may be connected to the interior or exterior surface of the housing.

Although the two housings 12 and 14 are shown as being fastened with wing-nut fasteners 16 and 18, it will be appreciated that any number of other fastening devices can also be used. Examples of other fastening devices are: nut and bolt fasteners, clips, straps, or the like.

Although light sources 28, 30, 32, 34 and 36 are shown as individual lights, it will be appreciated that any number of other illuminating devices can also be used. Examples of other illuminating devices are: fluorescent lamps, diodes, one continuous light source, or the like. Furthermore, although only housing 12 is shown as having a light source, it will be appreciated either housing may or may not have a light source.

Although the directional arrow 10 according to the invention has been described as being used in controlling traffic during emergency situations, it will be appreciated that the arrow can be used in a number of other situations such as: building or road construction, crowd control at public gatherings, control of airplane traffic during take offs and landings, or the like.

Although the invention has been shown and described with respect to exemplary embodiments thereof, various other changes, omissions, and additions in form and detail thereof may be made therein without departing from the spirit and scope of the invention.

What is claimed is:

1. A portable directional device comprising:
   a first housing having a first stem with a first wedge shaped head at a distal end, said first head including a first pair of arms extending outwardly along either side of said first stem to form an angle therewith, said first housing sized to fit into the trunk of a motor vehicle;
   a first attaching device disposed on a surface of said first stem, said first attaching device adapted to releasable attach and fixedly orient said first housing to an outside surface of a motor vehicle;
   a second housing having a second stem with a second wedge shaped head at a distal end, said second head including a second pair of arms extending outwardly along either side of said second stem to form an angle therewith, said second housing sized to fit into the trunk of a motor vehicle;
   a second attaching device disposed on a surface of said second stem, said second attaching device adapted to releasably attach and fixedly orient said second housing to an outside surface of a motor vehicle; and
   fastening devices extending completely through said first and second housings for releasably fastening said first and second housings together to provide a single portable directional device, wherein said fastening devices can be removed to separate said first and second housings for use as separate portable directional devices.

2. The portable directional device of claim 1 further comprising:
   at least a first light source attached to said first housing; and
   at least a first adaptor electrically connected to said first light source, and designed to plug into a cigarette lighter for a motor vehicle.

3. The portable directional device of claim 2 further comprising:
   at least a second light source attached to said second housing; and
   at least a second adaptor electrically connected to said second light source, and designed to plug into a cigarette lighter of a motor vehicle.

4. The portable directional device of claim 3 wherein said first housing has a first high-visibility color, and said second housing has a second high-visibility color.

5. The portable directional device of claim 4 wherein
   said first high-visibility color is red, yellow, blue, or orange; and
   said second high-visibility color is red, yellow, blue, or orange.

6. The portable directional device of claim 2 wherein said second housing has a high-visibility color.

7. The portable directional device of claim 6 wherein said high-visibility color is red, yellow, blue, or orange.

8. The portable directional device of claim 1 wherein said first housing has a first high-visibility color, and said second housing has a second high-visibility color.

9. The portable directional device of claim 8 wherein
   said first high-visibility color is red, yellow, blue, or orange; and
   said second high-visibility color is red, yellow, blue, or orange.

* * * * *